United States Patent
Gherardini (10) Patent No.: US 6,776,533 B2
(45) Date of Patent: Aug. 17, 2004

(54) LATCHING FIBER OPTIC CONNECTOR SYSTEM

(75) Inventor: Stephen Daniel Gherardini, Harrisburg, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 191 days.

(21) Appl. No.: 10/079,799

(22) Filed: Feb. 19, 2002

(65) Prior Publication Data

US 2003/0156797 A1 Aug. 21, 2003

(51) Int. Cl.[7] ............................... G02B 6/38; G02B 6/36
(52) U.S. Cl. ........................ 385/59; 385/56; 385/86
(58) Field of Search ............................... 385/56, 59, 86

(56) References Cited

U.S. PATENT DOCUMENTS

| | | | |
|---|---|---|---|
| 4,544,220 A | * 10/1985 | Aiello et al. | 439/594 |
| 4,762,388 A | 8/1988 | Tanaka et al. | 350/96.2 |
| 5,121,454 A | 6/1992 | Iwano et al. | 385/60 |
| 5,404,416 A | 4/1995 | Iwano et al. | 385/60 |
| 5,537,501 A | 7/1996 | Iwano et al. | 385/58 |
| 5,619,604 A | 4/1997 | Shiflett et al. | 385/59 |
| 5,775,931 A | * 7/1998 | Jones | 439/358 |
| 5,862,282 A | 1/1999 | Matsuura et al. | 385/86 |
| 5,876,230 A | * 3/1999 | Nishide et al. | 439/352 |
| 6,116,788 A | 9/2000 | Melchior et al. | 385/59 |
| 6,116,789 A | 9/2000 | Mrakovich et al. | 385/59 |
| 6,371,659 B1 | * 4/2002 | Weigel | 385/59 |
| 6,461,053 B1 | * 10/2002 | Mayercik et al. | 385/56 |

* cited by examiner

Primary Examiner—John D. Lee
Assistant Examiner—Tina M Lin
(74) Attorney, Agent, or Firm—Roger C. Turner (57) ABSTRACT

An optical fiber connector system includes first and second mateable connectors (12, 14) with fiber blocks (32,72) that hold optical fiber termini (50), wherein forward (F) movement of the second connector housing (70) toward the first housing (30) results in automatic latching together of the fiber blocks with the latches taking the forces of termini springs that have been partially compressed. The second fiber block (72) can slide within the second housing (70) between front and rear positions, and is held in the front position by a cam (90) that engages a free end (104) of a cam follower arm (103) of the second housing. As the connectors mate, a rigid second fiber block latch (100) deflects a resilient first housing latch end (62) and rides forward of it until faces of the blocks are close together. The second housing continues to be pushed forward until a latch blocker (122) of the second housing prevents the first housing latch from deflecting to release the second fiber block, to thereby hold the fiber blocks close together. When the cam follower (104) on the second housing deflects around the cam (90) on the second block, the second block is released and it moves rearwardly a small distance so the second fiber block latch abuts the first housing latch to take the forces of the partially compressed springs.

14 Claims, 9 Drawing Sheets

LATCHING FIBER OPTIC CONNECTOR SYSTEM

BACKGROUND OF THE INVENTION

One type of optical fiber connector system includes first and second housings that each holds a fiber block with optic termini therein, with one set of termini being spring biased towards the other termini. When the second housing is moved into the first housing, the tips of fiber-holding ferules abut. The second fiber block is usually moved forwardly until it is close to the front of the first fiber block, with the second fiber block then moving rearward a small distance until the forces of the springs are transmitted between the two housings. This avoids requiring the circuit boards on which the connectors are mounted, to apply constant forces to overcome the partial compression of the termini springs. A variety of mechanisms have been suggested for accomplishing the functions of keeping the termini pressed together while the spring forces are maintained by engaging portions of the two connectors, but prior mechanisms have been complicated and often awkward to use. A system that accomplished the required function, but which was simple and compact, would be of value.

SUMMARY OF THE INVENTION

In accordance with one embodiment of the present invention, an optical fiber connector system is provided which enables a second connector to be mated to a first one by simple forward movement of the second connector housing, the connectors then automatically latching in a position wherein optical termini of the two connectors firmly abut one another by compression of springs, and yet the spring compression forces are withstood by engagement of the two connectors, in a simple and compact latching arrangement. The first housing has a first housing latch and the second fiber block has a second fiber block latch that can deflect the first housing latch as the connectors mate, until the second fiber block latch lies forward of the first housing latch. Further forward movement of the second connector results in a latch blocker on the second housing preventing the first housing latch from deflecting to release the second fiber block latch. This assures latching together of the two fully mated connectors, and with the spring forces taken by the engaged first housing latch and second fiber block latch.

The second fiber block latch can slide within the second housing. However, a cam retains the second fiber latch in its forward position. The cam on the second fiber block latch has front and rear surfaces that each engage the free ends of arms of the second housing to deflect them out of the way as the second fiber block moves forward or rearward between its two extreme positions. In one arrangement, the rear surface of the cam on the second fiber block forms a ramp that deflects the latch arms outwardly, while the front surface of the second fiber block cam forms a wedge that deflects the arm free ends apart.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
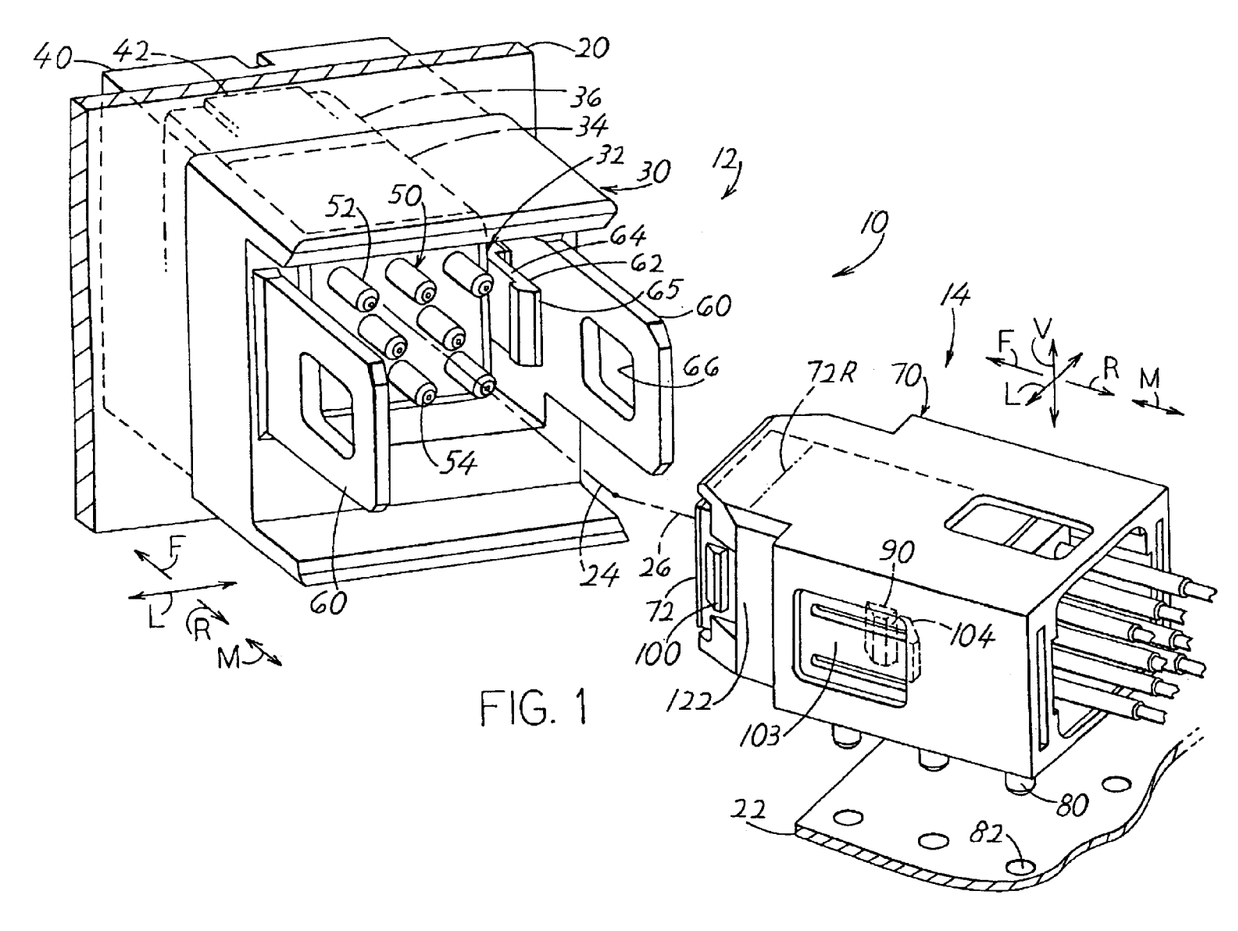
FIG. 1 is an exploded isometric view of an optical fiber connector system of the present invention, with the first connector mounted on a mother board and the second connector shown spaced from the daughter board on which it is usually mounted.
Figures 2, 3:
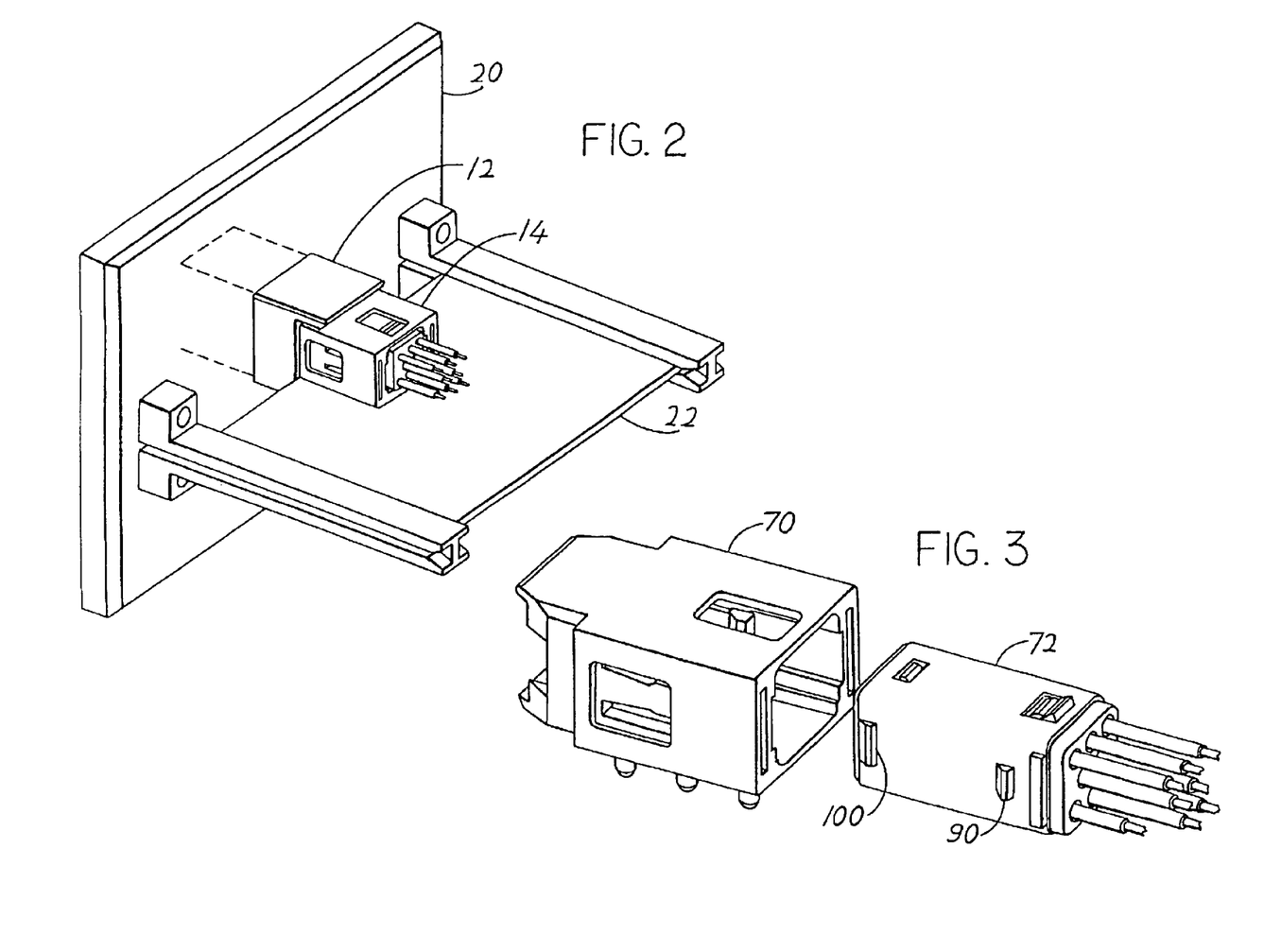
FIG. 2 is an isometric view of the system of FIG. 1, which each connector mounted on its corresponding circuit board, and with the two connectors fully mated.
FIG. 3 is an exploded view of the second connector of the system of FIG. 1.

FIG. 1 illustrates an optical fiber connector system 10 of the present invention, which includes first and second connectors 12, 14. Each connector is intended to mount on a circuit board 20, 22. The first circuit board 20 may be referred to a mother board, while the second circuit board 22 may be referred to as a daughter board. The first connector is a right angle connector in that its mating axis 24 is normal, or perpendicular, to the planes of the faces of the first circuit board 20. The second connector 14 has a mating axis 26 that is concentric with axis 24 and parallel to the planes of the faces of the second circuit board 22. Each connector is symmetrical about a vertical plane that passes through its axis 24 or 26.

The first connector 12 includes a first housing 30 and a first fiber block 32. The first fiber block 32 includes two block parts 34, 36 which are installed from the front end 40 of the first housing until latch retainers 42 hold the second block part 36 in place. The first connector includes a plurality of optical termini 50 with ferules 52 having tips 54 where the fiber tips are located. The ferules project rearwardly R from the first fiber block 32.

The first housing 30 has a pair of guides 60 at its laterally L opposite sides, and has first housing latches 62 at its laterally opposite sides. The first latches 62 include longitudinally M elongated latch arms 64 that allow the free rear ends 65 of the latches to deflect. The guides 60 have slots 66 that are useful in the latching operations described below.

The second connector 14 includes a second housing 70 and a second fiber block 72. The second fiber block is slideable in forward F and rearward R directions in the second housing. The rearward position of the second fiber block is indicated at 72R while its forward position is shown in solid lines in FIG. 1. The second housing has a plurality of feet 80 that fit into holes 82 in the second circuit board 22. The first housing fits into a square hole formed in the first circuit board.

Figure 4:
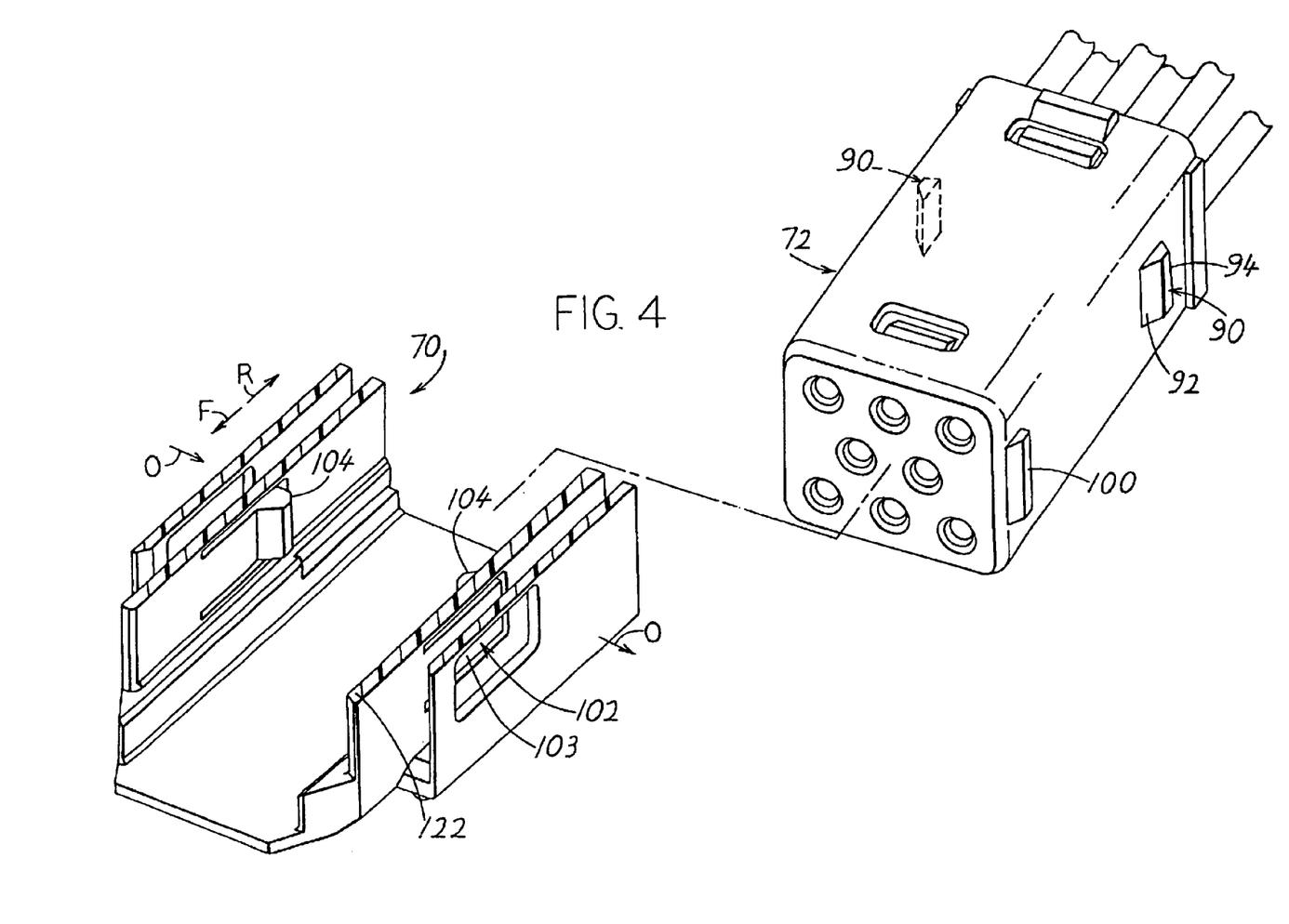
FIG. 4 is an exploded isometric view of the second connector of FIG. 3, with only a portion of the second housing shown and being shown in a sectional isometric view.

FIG. 4 shows that the second fiber block 72 has a cam 90 at each of its laterally opposite sides, each cam having front and rear cam surface 92, 94. The second housing 70 has a pair of cam follower devices 102 formed by free rear ends, or cam followers 104 of resilient arms 103. The front ends of the arms merge with the rest of the housing. When the second fiber block 72 moves to its forward position, the front cam surface 92 passes the arm free ends 104 and deflects them outwardly O. When the second fiber block moves to its rearward position, the rearward cam surface 94 moves across the arm free ends 104 and again deflects them outwardly. The second fiber block also has a second fiber block latch 100 which is fixed to the rest of the second fiber block, and which is used to hold the second fiber block to the first one.

Figure 5:
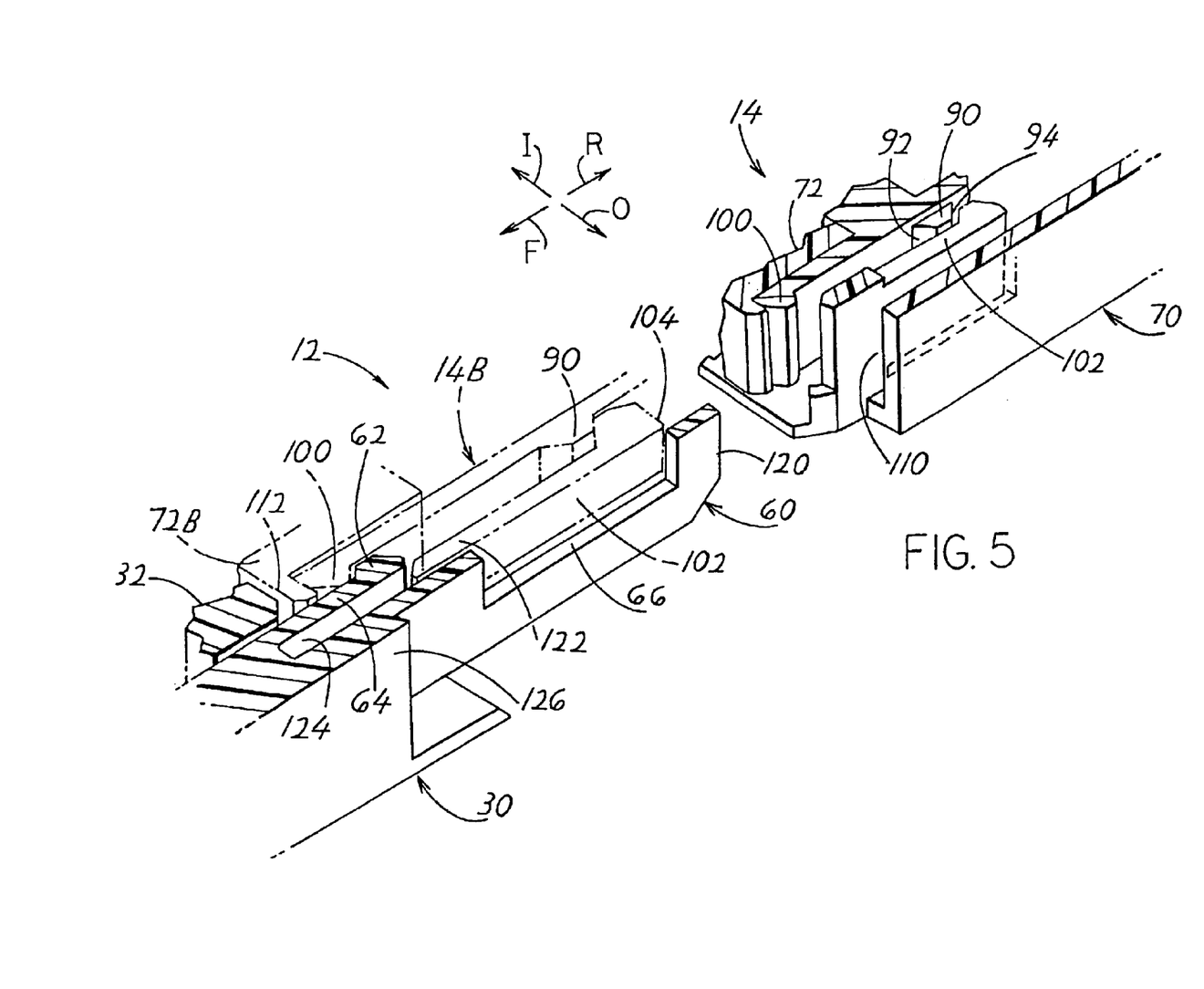
FIG. 5 is an exploded partial sectional isometric view of the two connectors of FIG. 1, and also showing, in phantom lines, the connectors partially mated.

FIG. 5 shows portions of the first and second connectors 12,14 in solid lines when they are spaced apart, with portions of the second connector shown at 14B in the course of mating the connectors. When the second connector 14 is moved forwardly F towards the first connector to mate with it, the guides 60 of the first connector move into guide-receiving slots 110 in the second connector housing 70. Further forward movement of the second connector results in the second fiber block latch 100 moving against the first housing latch 62. The first housing latch 62 has a resilient latch arm 64 that deflects in an outward O lateral direction to allow the second fiber block latch 100 to pass forward of the first housing latch 62, to achieve the position shown in phantom lines in FIG. 5.

When the second connector has achieved the position 14B of FIG. 5, the second connector can still move further forward, until a front end 112 of the second fiber block at the position 72B lies very close to a front end of the first fiber block 32. Such slight additional forward movement of the second connector from the position 14B results in the free end 104 of the cam follower arm 102 deflecting around the cam 90. Until such forward movement occurs, the free end 104 of the cam follower cannot deflect laterally outward O because such outward movement is blocked by a rear end 120 of the guide 60 of the first housing which serves as a restrainer. When the free end 104 is moved slightly further forward and deflects around the cam 90, a latch blocker 122 of the second housing moves into a space 124 between the first housing latch arm 64 and an outer side 126 of the first housing 30. Such forward movement of the latch blocker 122 prevents the first housing latch 62 from deflecting outwardly O, thereby preventing the second fiber block latch 100 from moving rearwardly.

Figure 6:
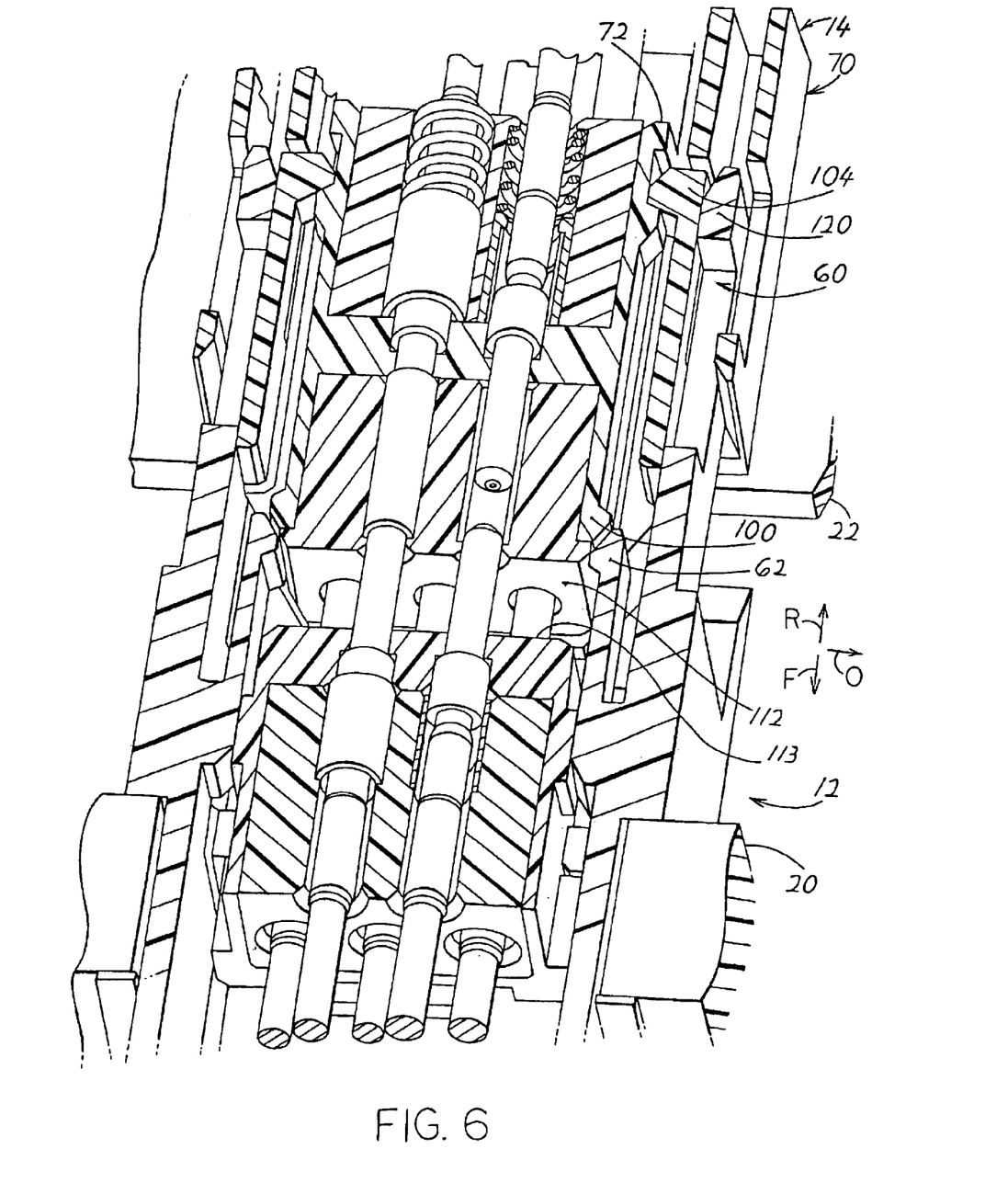
FIG. 6 is a partial sectional view of the two connectors of FIG. 1, showing the second connector approaching the first connector but not yet mated to it.

FIGS. 6–9 show the sequence of operation of the connectors as the second connector is moved forwardly to latch to the first one. FIG. 6 shows the second connector 14 approaching the first connector 12. The second fiber block 72 is in its initial, forward position relative to the second housing 70. In particular, the second fiber block latch at 100 is still rearward of the first housing latch 62, and the block faces 112, 113 are widely spaced. As the termini springs are compressed, the free end 104 of the cam follower is prevented form moving outwardly O by the rear end 120 of the guide 60 on the first housing.

Figure 7:
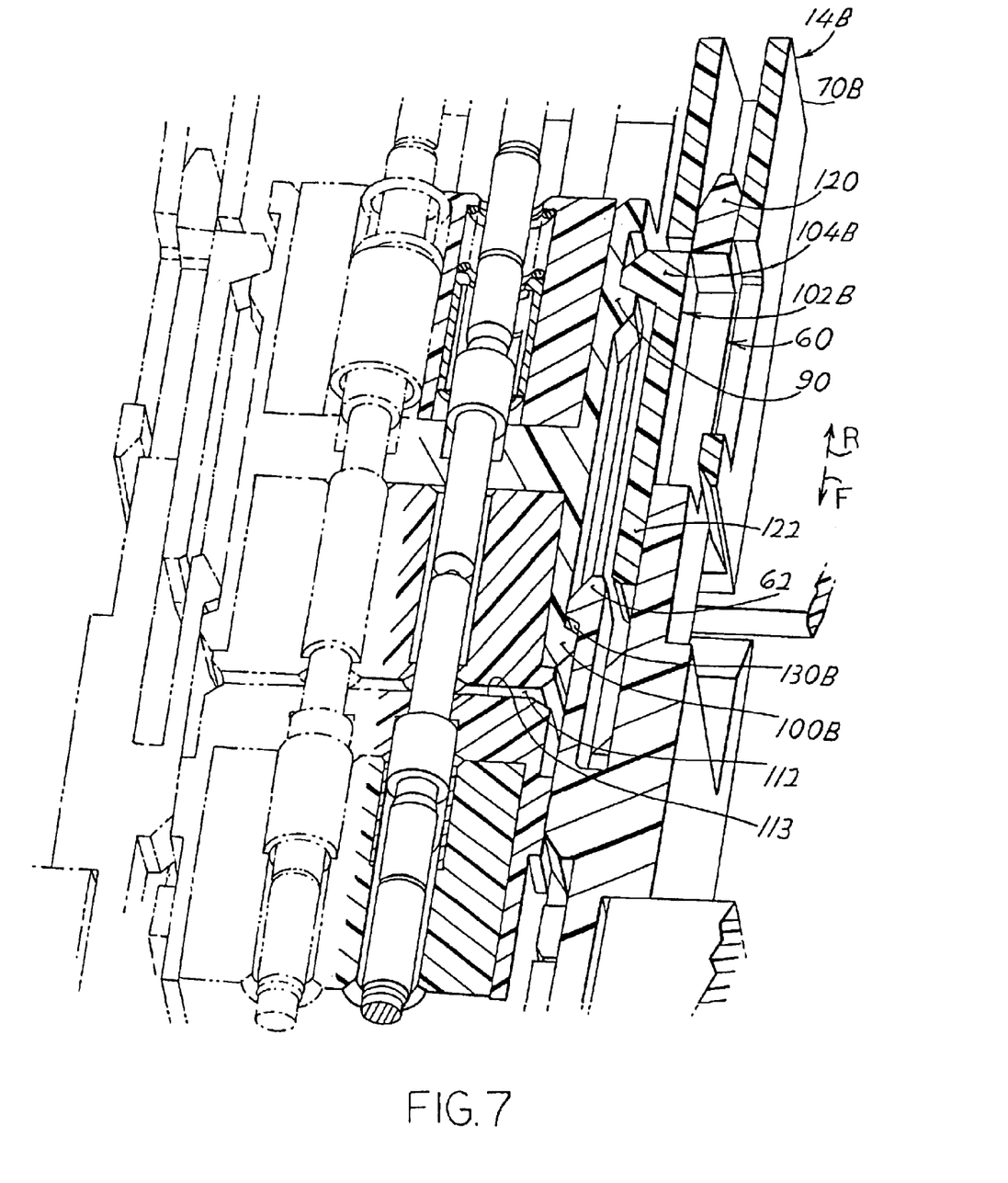
FIG. 7 is a view similar to that of FIG. 6, with minimum spring over-compression and with the second housing about to release the second fiber block.

FIG. 7 shows the first connector at 14B, which has moved forwardly from the position of FIG. 6, so the block faces 112, 113 are closer together, although still spaced apart. The second fiber block latch at 100B, has passed forward of the first housing latch 62, and has moved slightly beyond the first housing latch to leave a small gap 130B between them. During such forward movement of the second connector 14B, the person connecting the connectors has pushed the second connector housing at 70B forwardly F. The free end 104B of the cam follower 102B tends to deflect around the cam 90 of the second fiber block, but the rear end 120 of the second connector housing guide 60 prevents such deflection of the cam follower front end at 104B. The front tip of the latch blocker 122 has reached a position to prevent outward deflection of the second fiber block latch 100.

Figure 8:
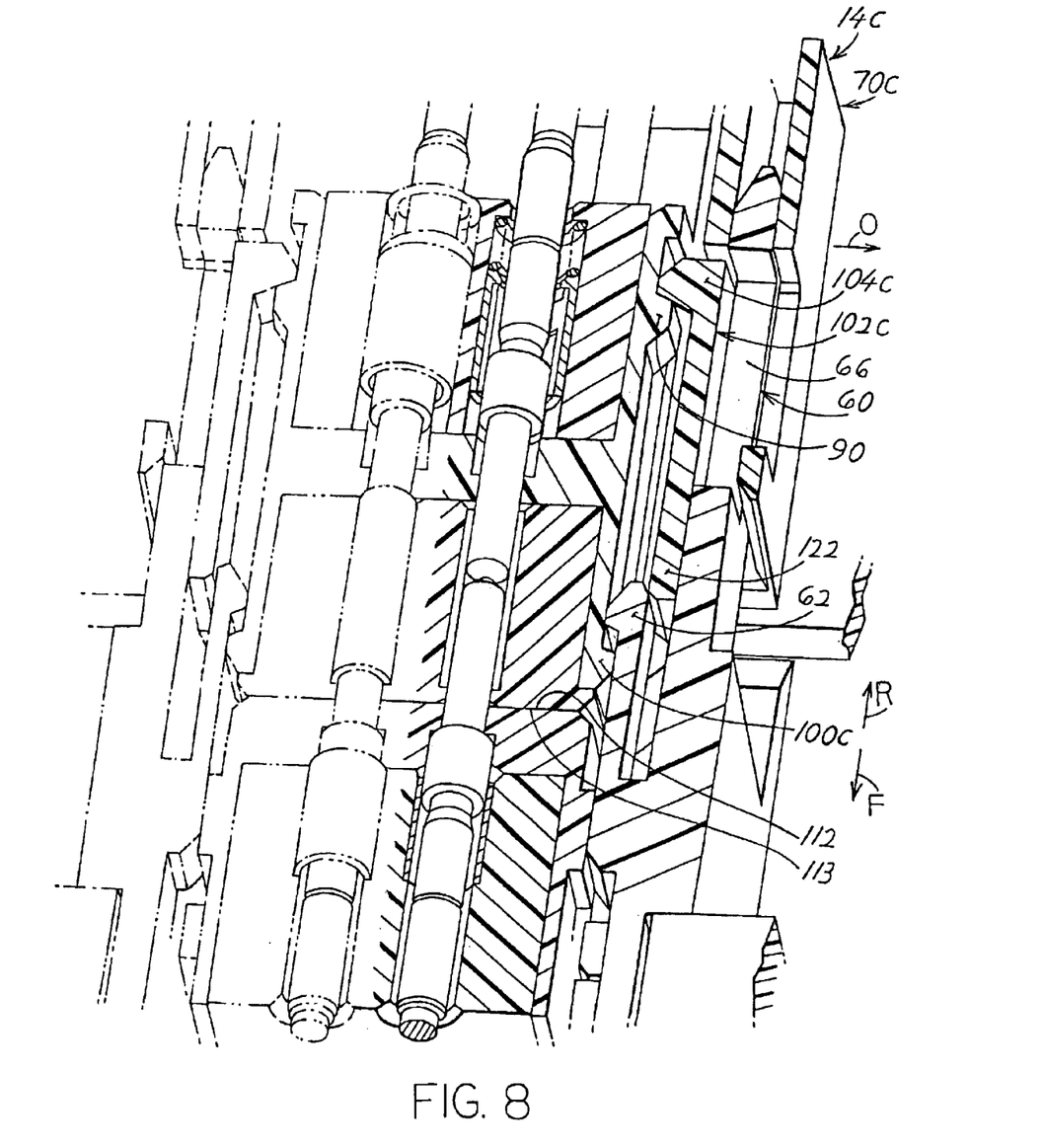
FIG. 8 is a view similar to FIG. 7, but with the termini springs over compressed to a maximum extent.

FIG. 8 shows the connectors when the second connector at 14C has moved even further forward, until the block faces 112, 113 almost abut one another (e.g. spaced 0.1 mm apart), which is as far forward as the second fiber block moves. In the position of FIG. 8, the front end 104C of the cam follower at 102C lies opposite the opening 66 in the first housing guide 60. As a result, the free end 104C of the cam follower deflects in the direction O around the cam 90 of the second fiber block, thereby allowing the second housing to move further forward. Such further forward movement allows the latch blocker 122 of the second housing to move securely beside the first housing latch 62 to prevent the first housing latch 62 from deflecting in the direction O.

Figure 9:
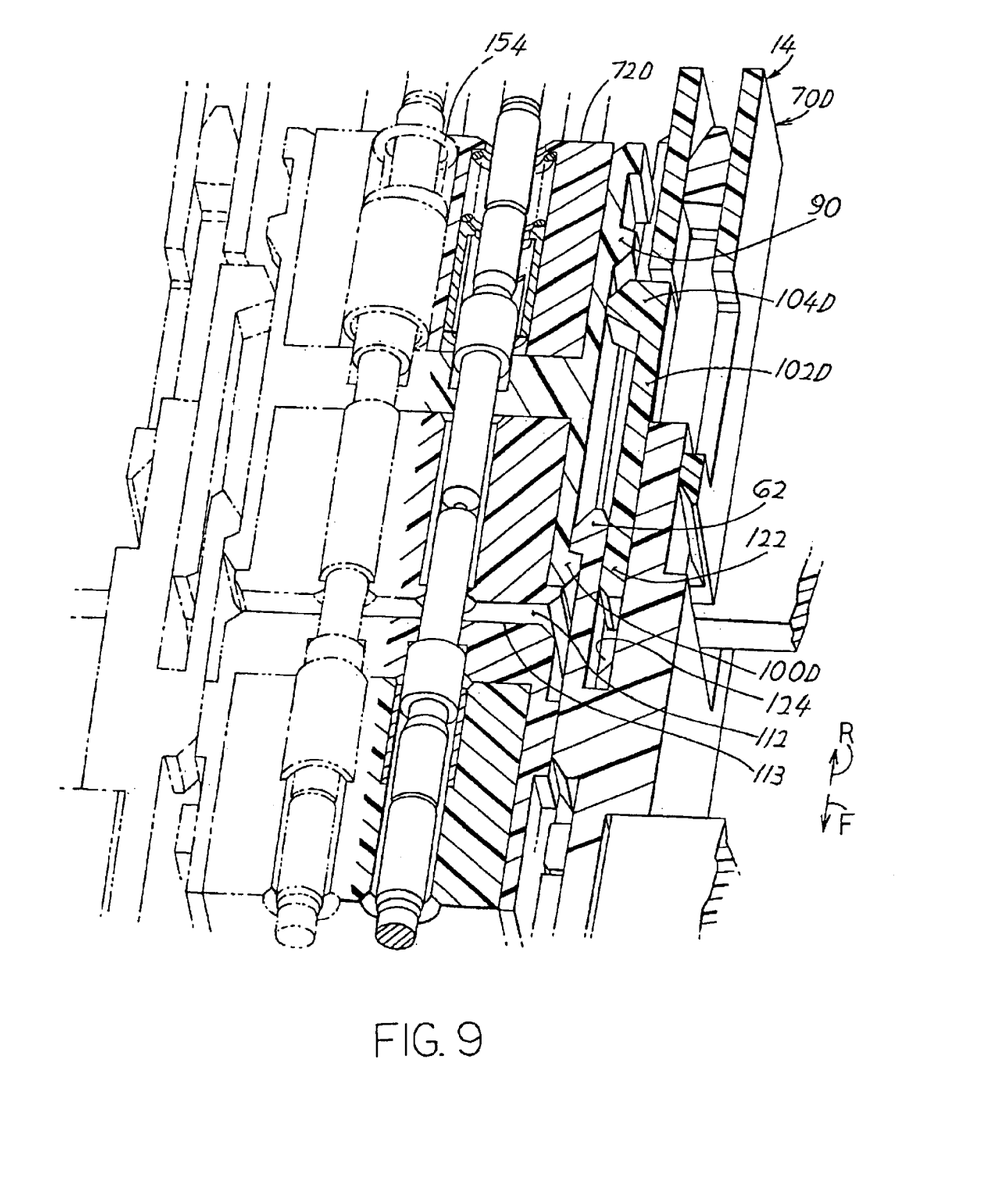
FIG. 9 is a view similar to FIG. 8, but wherein the second connector fiber block has moved rearwardly slightly and the second housing has moved forwardly, so the connectors are in a fully mated final position.

FIG. 9 shows the latch blocker 122 lying immediately outside the first block latch 62. The second housing at 70D cannot move any further forward because stops on the second housing and first connector abut, as when an edge of the daughter board 22 abuts the first housing. The second fiber block at 72D has moved slightly rearward from its position in FIG. 8 due to the forces of the termini springs 154, and due to the cam 90 of the second fiber block 72D not being pushed forward by the latch free end 104D. The second fiber block has moved rearward R until its cam 100 has been stopped by the latch end 62. The engagement of the cam 100 with latch 62 results in all of the force applied by the terminus springs 154 being born by such engagement of the cam 100 with the latch 62.

When the connectors are in the fully mated final position of FIG. 9, the connectors can be unmated by a person pulling the second connector housing 70D in a rearward direction R. The cam follower 104D on the second connector housing will move rearward of the cam 90. Until then, the second fiber block at 72D cannot move rearward because the latch block 122 prevents the first housing latch 62 from deflecting. However, when the cam follower 104D moves rearward of the cam 90, the latch blocker 122 moves rearward by a like amount so latch 62 is free to deflect and release the first latch 62 so the entire second connector can move rearward.

When the second connector is moved rearwardly out of engagement with the first connector, the front end 104D of the cam follower device 102D has moved rearward of the cam 90, and the second fiber block lies in its forward position, wherein the second connector is ready for again mating with the first connector.

The connector system is of compact and simple construction. As shown in FIG. 1, the only moveable part (during mating and unmating) of the first connector is the latch arm 64 that can flex outwardly. As shown in FIG. 5, the only moveable parts of the second connector are the second fiber block 72 which can shift forward and rearward, and the cam follower 102 which can deflect. Furthermore, the connectors are easily mated and unmated, with mating requiring that the second fiber block lie in its forward position, which it assumes when unmating the connectors. The relative forces for mating and unmating are determined by the inclines of the front and rear incline surfaces 92, 94 of the cam 90, the termini springs, and friction between components.

Figure 10:
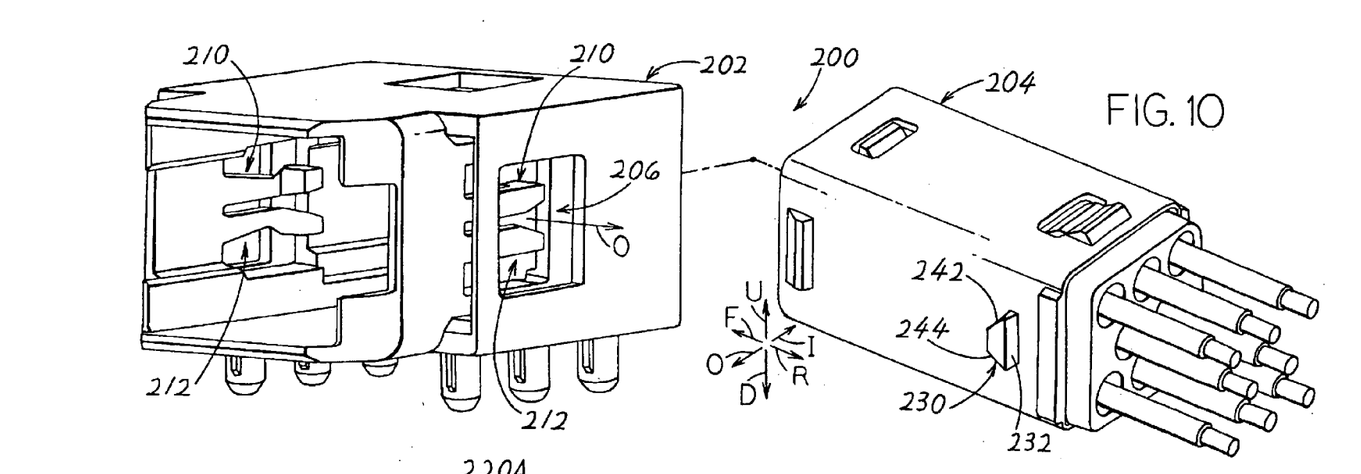
FIG. 10 is an exploded isometric view of a second connector of another embodiment of the invention, wherein the cam followers on each side of the second housing are deflected vertically apart.
Figure 11:
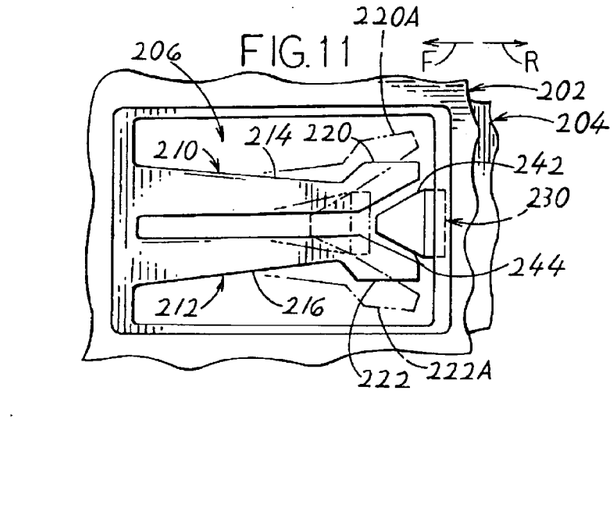
FIG. 11 is a side elevation view of the assembled connector of FIG. 10, showing a pair of cam follower arms.
Figure 12:
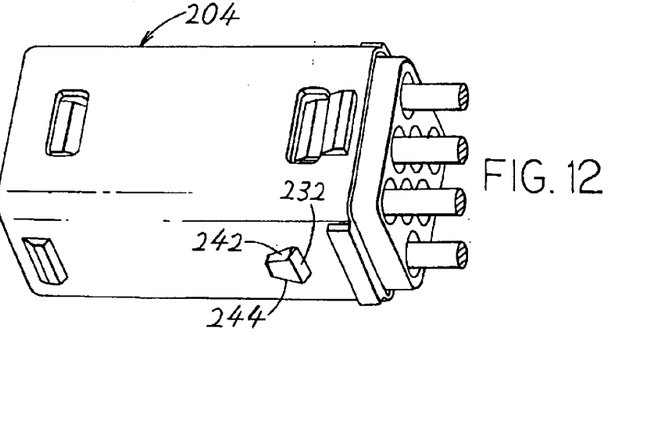
FIG. 12 is an isometric view of the second fiber block of the connector of FIG. 10.

FIGS. 10–12 illustrate a second connector 200 of another embodiment, with a modified second housing 202 and modified second fiber block 204. Instead of providing a single cam follower device at each side of the second housing, applicant provides an arrangement 206 with two cam follower devices 210, 212, each with a resilient arm 214, 216 and with a free rear end 220, 222 forming a cam follower. The arms can not only deflect outwardly O, but can deflect vertically away from each other.

The second fiber block 204 has a cam 230 with a rear side 232 that is inclined to extend at a forward F and outward O incline, to deflect the cam followers 220, 222 outwardly O as in the embodiment of FIGS. 1–9. However, the cam has a front side with an upper surface 242 that extends at a forward F and downward D incline, and has a lower surface 244 that extends at a forward F and upward U incline.

FIG. 11 shows that when the second housing 202 moves rearward R (but the block 204 does not move) during unmating of the connectors, that the free ends, or cam followers 220, 222 move against the upper and lower surfaces 242, 244 of the cam 230 on the second fiber block 204. The cam followers 220, 222 then deflect apart to positions 220A, 222A until the cam follower ends pass the cam 230. This has the advantage that disengagement can readily occur by pulling the second housing rearwardly without requiring it to be first pushed forwardly to push the second fiber block to its overtravel position. It would be possible to use only a single cam follower device such as 210 at each side. However, two of such devices whose arms deflect in opposite directions, avoids cocking the parts of the second connector, especially during unmating.

In a connector that applicant has constructed and tested, the first connector housing 30 (FIG. 1) had a maximum width and height that were each 17.8 mm, with other dimensions relative to the width and height of the first housing as illustrated in the drawings. The connectors were found to be rugged and easily operable in a natural manner.

Although terms such as "up" and "down" have been used to describe the invention as it is illustrated, the invention can be used in any orientation.

Thus, the invention provides a latching and unlatching fiber optic connector of simple and compact construction, and which can be operated by natural movements which involve pushing the second connector housing forwardly to mate the connectors and pulling the second connector housing rearwardly to unmate the connectors. The connector has a minimum number of moveable or deflectable parts.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector system comprising a first connector that includes a first housing, and a first fiber block with first passages and a plurality of first optic fiber termini each lying in one of said first passages, said system also including a second connector that includes a second housing, a second fiber block with second passages, and a plurality of second optical fiber termini each lying in one of said second passages, at least one of said connectors having at least one termini spring that can be deflected and that allows the corresponding termini to resiliently deflect along the corresponding passages when tips of the termini abut, said connectors being mateable by moving said second connector forwardly toward said first connector, wherein:

said first connector has a pair of first latches and said second fiber block has a pair of second latches, said connectors having guides that guide said connectors as they move together to align said latches, one of said pairs of latches being deflectable so said second latches can move rearward of said first latches by deflection of the deflectable latches as said connectors mate;

said second housing being slideable forwardly relative to said second fiber block when said first and second blocks substantially abut, and said second housing having latch blockers that prevent said deflectable latches from deflecting out of engagement with the other pair of latches when the second housing has moved forward relative to the second fiber block after the second latches pass the first latches during mating.

2. The system described in claim 1 wherein:

said first connector has restrainers that lie beside the path of said second housing to restrain said latch blockers from moving to blocking positions wherein said latch blockers prevent said deflectable latches from deflecting, until said second latches have moved forward of positions at which said first and second latches first latched.

3. The system described in claim 2 wherein:

said second housing has a cam follower arm with a free end forming a cam follower;

said second fiber block has a cam that lies in line with said cam follower, so when said second housing moves forward relative to said second fiber block, said cam follower deflects outwardly away from said second fiber block as said cam follower moves forwardly around and past said cam;

said restrainer are each positioned to lie on a side of said cam follower that is opposite said cam only when the cam on the second housing has not yet been moved sufficiently forward for the second latch to have passed the first latch.

4. The system described in claim 1 wherein:

said first housing has laterally opposite sides and has a pair of plate-like guides at said opposite sides, and said second housing has a pair of laterally opposite sides and has a pair of laterally-spaced slot walls at each of said second housing sides, each pair of laterally-spaced slot walls forming a guide slot that closely receives one of said plate-like guides, to align said connectors as they move together to mate;

each of said pair of slot walls of said second housing has an inner slot wall that lies adjacent to said second fiber block, each inner slot wall having a slit forming one of said cam follower arms with said free end forming said cam follower, and each cam follower deflects outwardly into a corresponding guide slot when the cam on the second fiber block deflects it;

each of said guides has a rear wall that forms a restrainer that blocks a cam follower free end from outward movement, and each of said guides has an empty space lying forward of the rear wall and into which the cam follower can deflect.

5. The system described in claim 1 wherein:

said second housing has a retainer arrangement for retaining said second fiber block in an initial forward position relative to said second housing, said arrangement including a cam on said second fiber block and said arrangement also including a pair of resilient arms on said second connector each arm having a free arm end forming a cam follower;

said cam having a wedge-shaped forward surface for separating said free arm ends as said second fiber block moves forward relative to said second housing.

6. The system described in claim 5 wherein:

said cam has a rear surface that is inclined to deflect said arm free ends outwardly away from said second fiber block as said second fiber block moves rearward to a latched rearward position.

7. In an optical fiber connector system which includes first and second mateable connectors with fiber-holding ferrules that abut during mating, wherein the first connector includes a first housing and a first fiber block fixed therein, and the second connector has second housing and a second fiber block that is slideable between forward an rearward positions in the second housing, each of said fiber blocks holding optic fiber termini with the termini in one of said fiber blocks being spring biased by springs toward the other termini, the improvement wherein:

said first connector has a deflectable first latch and said second fiber block has a second fiber block latch said latches being positioned to hold said second fiber block mated to said first fiber block and with tips of said ferrules abutting and said springs compressed;

said second housing has a latch blocker that blocks deflection of said first latch out of engagement with said second fiber block latch when said second housing has moved forward so said second fiber block lies in said rearward position relative to said second housing.

8. The system described in claim 7 wherein:

said second connector as a cam and cam follower arrangement that tends to retain said second fiber block in said forward position and in said rearward position, said cam and cam follower arrangement including a cam on said second fiber block and a resilient arm with a free arm end forming a cam follower on said second housing, said cam having forward and rearward surfaces that each deflects said free arm end as the cam moves forward and rearward past the free arm end.

9. The system described in claim 8 wherein:

said second housing and said second fiber block each has laterally opposite sides and vertically spaced top and bottom faces;

said resilient arm lies on a first of said sides of said second housing and said cam has a surface which is inclined from the vertical to deflect said free arm end vertically.

10. The system described in claim 8 wherein:

said first housing has a restrainer that lies beside the path of said cam follower to prevent it from deflecting around said cam until said second housing has moved sufficiently forward into said first housing.

11. A method for mating first and second connectors that have respective first and second housings and respective first and second fiber blocks that each hold optical fiber termini with the termini in at least one block being spring biased toward a mating end of the corresponding connector, which includes moving said second connector forwardly with respect to said first connector to mate said connectors until a second latch on said second fiber block deflects and passes forwardly past a first latch end of a first latch on said first connector, wherein said first latch includes a first resilient arm and said first latch end is on said first resilient arm, wherein:

said step of moving said connectors includes moving said second housing forwardly while said termini in said connectors abut and said second fiber block does not move forwardly as much as said second housing, while moving a blocking portion of said second housing beside said first latch to prevent said first latch from deflecting out of the path of said second latch as said second latch moves rearwardly to a final mating position.

12. The method described in claim 11 including:

preventing said blocking portion of said second housing from moving beside said first latch to prevent said first latch from deflecting, until the second latch has passed forward of the first latch, including positioning a restrainer of the first housing in the way of deflection of a resiliently deflectable cam follower of the second housing, while requiring the cam follower to deflect around a cam on the second fiber block in order to move the first housing forward relative to the second fiber housing, until the deflectable cam follower has moved forward of the restrainer.

13. A second optical fiber connector comprising:

a second housing;

a second fiber block that is slideable in longitudinal forward and rearward directions in the second housing between forward and rearward positions;

the second housing has a pair of resilient arms with free ends;

the second fiber block has a cam with a first longitudinal end that is tapered to spread apart said arm free ends when the second fiber block slides in one of said longitudinal directions.

14. The connector described in claim 13 wherein:

said cam has a second end that forms a ramp to deflect said arm free ends outwardly away from said second fiber block when the second fiber block slides in a second of said longitudinal directions.

* * * * *